(12) United States Patent
Desa et al.

(10) Patent No.: US 6,568,266 B1
(45) Date of Patent: May 27, 2003

(54) PRESSURE HOUSING FOR IN-WATER PRESSURE BASED SYSTEMS

(75) Inventors: Ehrlich Desa, Dona Paula (IN); Gajanan Purushottam Naik, Dona Paula (IN); Antony Joseph, Dona Paula (IN); Elgar Stephen Desa, Dona Paula (IN); Prakash Mehra, Dona Paula (IN); Vijay Kumar, Dona Paula (IN); Shivanand Prabhu Desai, Dona Paula (IN); Surekha Mahesh Nagvekar, Dona Paula (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/033,220

(22) Filed: Dec. 27, 2001

(51) Int. Cl.⁷ .................................................. G01L 9/08
(52) U.S. Cl. ........................... 73/431; 73/1.57; 73/1.69; 73/31.04; 73/31.05; 73/292; 73/299
(58) Field of Search .................................. 73/1.57, 1.69, 73/431, 31.04, 31.05, 292, 299; 374/136

(56) References Cited

U.S. PATENT DOCUMENTS

| | | | |
|---|---|---|---|
| 2,259,867 A | * 10/1941 | Webster | 73/300 |
| 4,646,574 A | * 3/1987 | Wahl et al. | 73/431 |
| 4,854,728 A | * 8/1989 | Baron et al. | 374/1 |
| 5,142,914 A | * 9/1992 | Kusakabe et al. | 73/115 |
| 5,351,538 A | * 10/1994 | McGuire et al. | 43/4 |
| 5,834,641 A | * 11/1998 | Sternal | 374/136 |

OTHER PUBLICATIONS

V.B. Peshwe et al., *Indian Journal of Marine Sciences*, 1980, 9:73–76.

Anthony Joseph et al., *J. Phys. E. Sci. Instru.*, 1984, 17:1135–1138.

Anthony Joseph et al., *J. of Atomspheric and Oceanic Techn.*, Amer. Metrological Soc., 1994, 11(2):525–533.

Anthony Joseph et al., *J. of Atomspheric and Oceanic Techn.*, Amer. Metrological Soc., 2000, 17(3):357–365.

John E. Huguenin et al., *IEEE Ocean '75*, 1975, 444–453.

J.H. Filloux, *Nature*, 1970, 226:935–937.

Gunter Dietrich et al., *General Oceanography, an Introduction*, 1980, 128–131.

* cited by examiner

*Primary Examiner*—Hezron Williams
*Assistant Examiner*—David A Rogers
(74) *Attorney, Agent, or Firm*—Morgan & Finnegan, LLP

(57) ABSTRACT

The present invention relates to a pressure housing for in-water pressure based systems and to a method for improving the life of the transducers and electronics of underwater systems by maintaining a humidity-free and clean environment around them by avoiding the entry of humidity, dust, or any suspended particles in the air during occasional data offloading and battery replacement in a humid and dust-laden field station; improving the ease of closing and opening of the pressure housing by the use of a novel arrangement thereby avoiding the use of conventionally employed cumbersome protruding and corrosion-prone locking devices such as screws, bolts, or clamps; and implementing reliable transmission of water pressure to the pressure port of the transducer, simultaneously minimizing the errors arising from dynamic pressure effects, preventing its chemical corrosion from saline water, and arresting bio-fouling in the vicinity of the pressure inlet.

7 Claims, 6 Drawing Sheets

COUNCIL OF SCIENTIFIC &
INDUSTRIAL RESEARCH

PRESSURE HOUSING FOR IN-WATER PRESSURE BASED SYSTEMS

FIELD OF THE INVENTION

The present invention relates to pressure housing for in-water pressure based systems. More particularly, this, invention relates to a novel device for (1) improving the life of the transducers and electronics of underwater systems by maintaining a humidity-free and clean environment around them by avoiding the entry of humidity, dust, or any suspended particles in the air during occasional data offloading and battery replacement in a humid and dust-laden field station; (2) improving the ease of closing and opening of the pressure housing by the use of a novel arrangement thereby avoiding the use of conventionally employed cumbersome protruding and corrosion-prone locking devices such as screws, bolts, or clamps; and (3) implementing reliable transmission of water pressure to the pressure port of the transducer, simultaneously minimizing the errors arising from dynamic pressure effects, preventing its chemical corrosion from saline water, and arresting, bio-fouling in the vicinity of the pressure inlet.

BACKGROUND OF THE INVENTION

Hitherto known in-water pressure based systems [V. B. Peshwe, S. G. Diwan, A. Joseph, and E. Desa, "Wave and Tide Gauge", *Indian Journal of Marine Sciences,* Vol. 9, pp. 73–76 (1980)] describes a Wave and Tide Gauge wherein the underwater electronics and the pressure sensor are placed and secured on a circular brass plate which fits into a brass cylinder. O-rings are used for sealing the underwater unit, which is mounted on a steel base. All steel components are nickel-plated, and the brass components are coated with paint. The pressure sensitive metallic diaphragm of the pressure transducer is protected against chemical corrosion with the use of an oil-filled neoprene nipple attached to a stainless steel coupler located on the flat face of the removable end-plate and hydraulically connected to the pressure port. The end-plate is locked to the flange of the cylindrical housing with the use of four bolts, washers, and nuts that are located in diametrically opposite sense. The disadvantage of this arrangement is the occasional damage to the neoprene rubber nipple arising from fish bites, resulting in the loss of oil that protects the pressure port of the transducer against chemical corrosion. Another drawback is protrusion of bolts and nuts, which provides a poor aesthetic appearance of the housing.

An alternate system, [A. Joseph and E. S. Desa, "A Microprocessor-Based Tide Measuring System", *Journal of Physics, E. Scientific Instruments,* Vol. 17, pp. 1135–1138 (1984)], describes a tide measuring system that consists of a cylindrical underwater pressure housing made of brass, containing a Paroscientific quartz pressure transducer. The said pressure transducer is located on a circular brass base-plate of the housing, with the pressure inlet exposed t seawater through an O-ring-protected orifice on the base-plate. The entire housing is sealed with another larger O-ring located between the cylindrical housing and its base-plate. The said base-plate is mounted to the circular flange of the cylindrical housing with the use of 6 units of stainless steel bolts, washers, and nuts. A drawback of this methodology of sealing the pressure housing is that special care has to be taken to tighten the diametrically opposite bolts one at a time. Failing to do so can damage the O-ring by exceeding its elastic limit, thereby resulting in the possibility of leakage of the pressure housing and the damage of the transducer. Another drawback observed was that the underwater connector used for the transfer of data to an external readout unit suffered chemical corrosion after extended submergence in seawater. The hydraulic coupling device incorporated with the Paroscientific quartz pressure transducer comprises a silicone-oil-filled flexible plastic capillary tube of internal diameter ~1 mm and length ~200 mm, having one end attached to the pressure port of the transducer and the other end connected to the end-cap of the transducer housing. The drawback observed with this hydraulic coupling device in field studies is a slow leakage of oil over time.

Another system, [A. Joseph and E. Desa, "An Evaluation of Free- and Fixed-Vane Flow Meters with Curved- and Flat-Bladed Savonius Rotors", *Journal of Atmospheric and Oceanic Technology, American Meteorological Society,* Vol.11, No.2, pp.525–533 (1994)] describe two types of current meters-cum-depth indicators that use in-water pressure housing to locate sensors and electronics printed circuit boards. In these instruments the pressure housing is closed with an end-plate assembly that formed part of the supporting mechanism for the water current sensor. The pressure sensor used for estimation of water depth is located on a horizontal step of the pressure housing. The said pressure housing is attached to the end-plate assembly with the use of four equally spaced bolts. Two disadvantages observed with this arrangement are (1) protruding locking bolts and (2) a protruding pressure inlet that is vulnerable to deterioration in pressure measurement accuracy resulting from the adverse influence of flows, waves, or a combination of flows and waves as discussed by A. Joseph, J. A. E. Desa, P. Foden, K. Taylor, J. McKeown, and E. Desa [in: "Evaluation and performance enhancement of a pressure transducer under flows, waves, and a combination of flows and waves, *Journal of Atmospheric and Oceanic Technology, American Meteorological Society,* Vol. 17, No. 3, pp. 357–365 (2000)].

In yet an other version of in-water pressure devices for measurements of water current, water level, and many other oceanographic parameters, Aanderaa Instruments (Norway) uses a cylindrical metallic housing having a removable end-cap at one end, and a fixed end-cap at the other end, wherein the removable end-cap is locked with the use of two metallic clamps that are hooked into slots that are carved out on the diametrically opposite positions on the periphery of the end-cap and the cylindrical housing. In these devices the pressure transducer's pressure inlet protrudes out and, therefore, suffers from pressure-measurement errors induced by various kinds of water motion in its vicinity.

The principal drawback with all conventional underwater pressure housings that are constructed from metal and whose metallic end-caps are locked with the use of devices such as metallic screws, bolts, or clamps is that they suffer from chemical corrosion after prolonged exposure to seawater, and makes opening of the end-plates usually difficult. Further, the presence of these protruding devices reduces the aesthetic appearance of the pressure housing.

OBJECTS OF THE INVENTION

The main object of the present invention is to improve the life of the transducers and the electronics of any underwater systems by maintaining a humidity-free and clean environment around them by avoiding the entry of humidity, dust, or any suspended particles in the air during occasional data offloading and battery replacement in a humid and dust-laden field station.

Another object of the present invention is to improve the ease of closing and opening of the pressure housing by the use of a novel arrangement thereby avoiding the use of conventionally employed cumbersome protruding and corrosion-prone locking devices such as screws, bolts, or clamps.

Yet another object of the present invention is to implement reliable transmission of water pressure too the pressure port of the transducer, simultaneously minimizing the errors arising from dynamic pressure effects, preventing its chemical corrosion from saline water, and arresting bio-fouling in the vicinity of the pressure inlet.

SUMMARY OF THE INVENTION

The novel pressure housing for in-water pressure based systems of the present invention provides for:

(1) Improving the life of the transducers and the electronics of any underwater systems by maintaining a humidity-free and clean environment around them by avoiding the entry of humidity, dust, or any suspended particles in the air during occasional data offloading and battery replacement in a humid and dust-laden field-station. The system of the present invention provides for two independent compartments, a transducer-cum-electronics compartment that is exclusively meant for housing the transducers and the electronics (that are not to be disturbed) and a battery-cum-connector compartment exclusively meant for housing the battery and the computer-interfacing connector, thereby providing a means for housing the environmentally sensitive transducers and the electronics in a clean and humid-free environment by avoiding the entry of humidity, dust, or any suspended particles in the air during occasional data offloading and battery replacement performed in the remote field stations, in an often dusty and moist coastal environment. Further, the two compartments are carved out from a single solid non-metallic material for elegance, lightness, and non-corrosiveness in a marine environment.

(2) Improving the ease of closing and opening of the pressure housing by the use of a novel arrangement thereby avoiding the use of conventionally employed cumbersome protruding and corrosion-prone locking devices such as screws, bolts, or clamps. The system of the present invention provides for a threaded non-metallic locating-ring to locate the seal-plate of the transducer-cum-electronics compartment in its assigned position. The system of the present invention further provides for a threaded cylindrical portion that is carved out on the top central portion of the non-metallic seal-plate of the battery-cum-connector-compartment which functions as a simple mechanism that facilitates trouble-free opening of the said seal-plate. The said seal-plate, having a threaded central male portion, is simply pushed into position, and rests on a circular step carved out from the inner surface of the cylindrical pressure housing. A threaded non-metallic end-cap (provided with a female portion for use during opening) placed over the said seal-plate locates it in position. A threaded non-metallic locating-ring keeps the seal-plate and the end-cap in its assigned position. Further, the system of the present invention allows for easy opening of the battery-cum-connector-compartment by first unscrewing the said locating-ring, opening out the end-cap, coupling the female portion of the end-cap with the male portion of the seal plate, and then pulling it out with ease and comfort.

(3) Implementing reliable transmission of water pressure to the pressure port of the transducer, simultaneously minimizing the errors arising from dynamic pressure effects, preventing its chemical corrosion from saline water, and arresting bio-fouling in the vicinity of the pressure inlet with the use of a compact, non-corrosive, bio-fouling-resistant hydraulic coupling device. Thus, the system of the present invention provides for a hydraulic coupling device (HCD) that consists essentially of a male component and a female component. A copper cylindrical rod machined in the form of a counter-sunk screw and a second copper cylindrical rod having internal and external threading constitutes the male and the female components respectively of the HCD. This coupling device forms an integral part of the pressure transducer as well as the end-cap of the transducer-cum-electronics compartment of the pressure housing. These components, together wit the viscous oil deposited within the space between the front-end of the pressure transducer and the said counter-sunk screw, form the HCD of the system of the present invention. The narrow gap between the threads of the male and the female components of the HCD provides the requisite path for transmission of seawater pressure to the pressure-port of the transducer, via the oil medium, thereby hydraulically connecting the pressure transducer to the surrounding saline water medium. The copper material of the HCD, because of its ability to repel marine growth, as reported by J. E. Huguenin and F. J. Ansuini in ["The advantages and limitations of using copper material in marine aquaculture", *Proc. IEEE Oceans '75*, pp. 444–453 (1975)], eliminates the possibility of closure of the pressure inlet by bio-fouling during its prolonged exposure to the euphotic water medium. The viscous oil present within the HCD inhibits physical contact of the pressure-sensing element with the seawater, at the same time transferring the seawater pressure to the transducer (i.e., hydraulically coupling). The HCD provided in the system of the present invention allows for easy replacement of oil by merely unscrewing its male component from its slot, pouring oil into the pressure port, and then screwing it back again, thereby preventing trapping of air bubbles or other hollow closed spaces within the oil reservoir. The HCD provided in the system of the present invention is suitable for integration to the end-cap of the pressure housing. The time-constant of the spiral-shaped oil path provides a certain level of mechanical filtering of the high-frequency oscillations present in pressure measurements, caused primarily by wind-induced gravity waves and secondly by the movements of ships and boats. Because the compact flat face of the HCD provided in the system of the present invention remains flush with the flat end-plate of the pressure housing, dynamically induced measurement inaccuracies arising from the influence of flows, waves, or a combination of flows and waves are minimized, as reported by A. Joseph, J. A. E. Desa, P. Foden, K. Taylor, J. McKeown, and E. Desa [in: Evaluation and performance enhancement of a pressure transducer under flows, waves, and a combination of flows and waves, *Journal of Atmospheric and Oceanic Technology, American Meteorological Society*, Vol. 17, No. 3, pp. 357–365 (2000)]. The simpler design of the HCD incorporated in the present invention of a novel pressure housing for in-water pressure based systems allows a much easier and more economically feasible construction that heretofore been unknown. Accordingly, the hydraulic coupling device incorporated in the present invention of a novel pressure housing for in-water pressure based systems is superior to all the hitherto known hydraulic coupling devices including those described by J. H Filloux [in "Deep sea tide gauge with optical readout of Bourdon tube rotations", Nature, Vol. 226, pp. 935–937

(1970); G. Dietrich, K. Kalle, W. Kraus, and G. Siedler [in "Measurement of water level variations", General Oceanography: An Introduction, pp. 128–131 (1980)]; and E. Desa, A. Joseph, D. Rodrigues, V. N. Chodankar, and S. Tengali [in "An improved hydraulic coupling de vice for use with in-water pressure based systems" pending Indian Patent Application No. 487/DEL/99].

Accordingly the present invention provides a pressure housing for in-water pressure based systems, which comprises a housing [12] having two compartments [13] and [14], the two compartments being separated from each other by a circular disc [15], one of the said compartments [13] dedicated to mount the transducers and the electronics and the other compartment [14] dedicated to locate the battery-pack and the electric connector that would interface to a computer or any other device that enables initialization of the electronics and data offload, an electrical connector [16] provided with an O-ring [17] and axially located at the center of the circular disc [15] to electrically connect the two compartments [13] and [14], a seal plate [18] provided with a pair of lateral O-rings [19] and [20] to weatherproof the transducers-cum-electronics compartment [13], a retainer ring [24] for locking the seal plate [18] in its designated position, another seal plate [21] provided with a pair of lateral O-rings [22] and [23] to waterproof the batterypack-cum-connector compartment [14], a retainer ring [25] for positioning the seal plate [21] in its designated location, and a lock ring [26] for locking the retainer ring [25], a hydraulic coupling device consisting essentially of a female component [28] and a male component machined in the form of a counter-sunk screw [29], wherein the said female and male components form an integral part of the pressure transducer [30] as well as the end-cap [18] of the transducer-cum-electronics compartment [13] of the pressure housing [12], the said two components, together with the viscous oil deposited within the space provided between the front-end of the pressure transducer and the said counter-sunk screw, and the narrow gap between the threads of the said male and the female components of the hydraulic coupling device providing the requisite path for transmission of seawater pressure to the pressure-port of the transducer, thereby hydraulically connecting the pressure transducer to the surrounding saline water medium, a hollow cylindrical shaped transducer-retainer [31] screwed on the inner face of an axial recess on the seal plate [18] for providing mechanical stability to the pressure transducer [30], another hollow cylinder [32] screwed on the outer face of a step on the seal plate [18] for mounting two clamps [33] which serve as means for mounting the printed circuit board (pcb)[34], with the use of four similar screws [35], a hollow space carved out from a metal bolt [36], rendered waterproof with the use of an O-ring [37] for locating a temperature sensor [38] for measurement of water temperature, a t atterypack [39] for supplying electric power to the circuits and sensors, and a computer-interfacing means [40] for initialization and data offloading.

In one embodiment of the invention, the body of the pressure housing [12], the seal plates [18] and [21], and locking rings [24], [25], and [26] are all fabricated from non-metallic materials to prevent chemically induced corrosion during prolonged submergence in seawater or polluted water bodies.

In a further embodiment of the invention, the retainer ring [25] for positioning the seal plate [21] in its designated location, and a lock ring [26] for locking the pressure housing avoids the necessity for use of conventionally used protruding bolts, nuts, or clamps.

In yet another embodiment of the invention, the hydraulic coupling device is provided with a female component [28] and a male component [29], both being selected from copper or copper alloy, or any other alternate material capable of inhibiting bio-fouling in the vicinity of the pressure inlet.

In another embodiment of the invention, the hydraulic coupling device is provided with a flat termination that is located on the flat seal plate of the pressure housing and flush with it in such a manner as to abate dynamically induced pressure-measurement inaccuracies arising from the influence of flows, waves, or a combination of flows and waves.

In a further embodiment of the invention, the cylindrical collars [43] of the mounting device are provided with two cushioning non-metallic collars [44] sandwiched between the metallic collars and the curved surface of the two groves carved on the surface of the non-metallic pressure housing, thereby preventing possible biting action on the pressure housing by the metallic Collars.

In yet an other embodiment of the invention, a self-adhesive polyester thin film sticker is used protect the smooth surface areas of the non-metallic pressure housing against marine growth and the metallic mounting device against pitting action, thereby enhancing the health of the pressure housing and the mounting device and enabling their trouble-free cleansing after retrieval from the seawater after prolong submergence.

In another embodiment of the invention, the use of self-adhesive polyester transparent thin film stickers maintains the original colour and texture of the pressure housing and its mounting device, and provides an additional means for preserving the text stamped on the pressure housing.

BRIEF DESCRIPTION OF THE ACCOMPANYING DRAWINGS

In the drawings accompanying this specification:

DETAILED DESCRIPTION OF THE INVENTION

The invention will now be described in detail with reference to the accompanying drawings.

Figure 1:
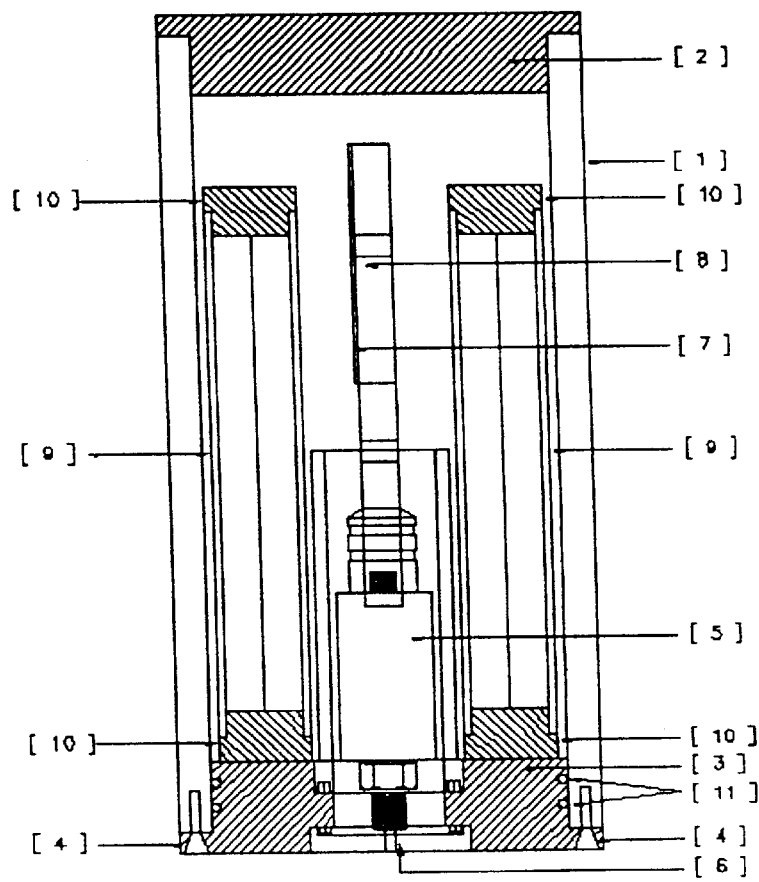
FIG. 1 represents a conventional methodology of the prior art used in in-water pressure based systems.

FIG. 1 represents a typical design example, showing a conventional methodology of the prior art used in in-water pressure based systems, which consists primarily of a single cylindrical housing [1] of a marine grade material, having a fixed end-cap [2], and a removable end-cap [3] which is secured on the wall of the housing with screws [4]. The pressure transducer [5] is fitted to the end-cap, and a hydraulic coupling device [6] is locked on to the end-cap. The group of electronics printed circuit boards (pcb) [7] is rigidly mounted on a set of vertical mounting pillars [8] enclosed within the housing [1]. Two cylindrical tubes [9] sealed with end-caps [10] hold the batteries that power the electronics and the sensors. The entire assembly is built and supported upon its single removable end-cap [3], which is provided with O-rings [11] to ensure waterproofing.

Figure 2:
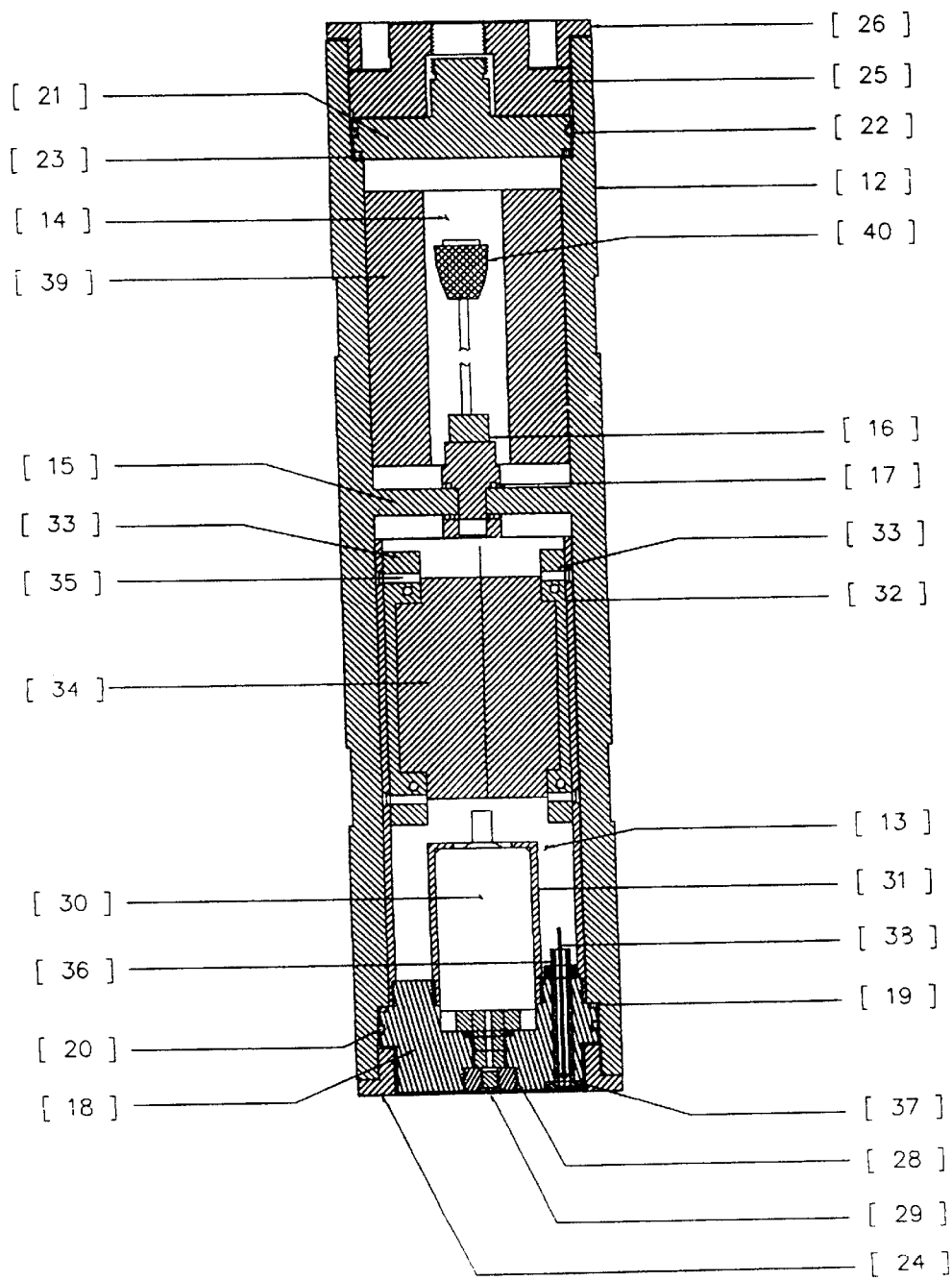
FIG. 2 represents the cross-sectional view of the novel pressure housing for in-water pressure based systems of the present invention.

FIG. 2 is a cross-sectional view of the novel pressure housing for in-water pressure based systems of the present invention, which consists primarily of a cylindrical housing [12] having two compartments [13] and [14] carved out from a single solid material. The circular disc [15] thereby formed separates the two compartments from each other. The transducers-cum-electronics compartment [13] is dedicated to mount the transducers and the electronics, and not to be opened in a field station. The battery pack-cum-connector compartment [14] is dedicated to locate the battery pack and the electric connector that would interface to a computer or any other device that enables initialization of the electronics and data offload. This enables the environmentally sensitive electronic components and the transducers to be free from the adverse impact of contaminating agents such as suspended particles in the air, dust, humidity etc., that might be present during occasional data offloading, initialization of the instrument, or battery replacement performed in field stations. An electrical connector [16] that is provided with an O-ring [17] and axially located at the center of the circular disc [15] serves the purpose of electrically connecting the two compartments [13] and [14]. A seal plate [18] provided with a pair of lateral O-rings [19] and [20] enables waterproofing of the transducers-cum-electronics compartment [13]. A retainer ring [24] locks the seal plate [18] in its designated position. Another seal plate [21] provided with a pair of lateral O-rings [22] and [23] enables waterproofing of the battery pack-cum-connector compartment [14]. A retainer ring [25] positions the seal plate [21] in its designated location, and a lock ring [26] locks the retainer ring [25], thereby providing an elegant locking device without the use of screws, bolts, nuts, or clamps. The locking devices used in the novel pressure housing of the present invention are all fabricated from non-metal, thereby eliminating the possibility of their chemical corrosion during its prolong submergence in seawater. The system of the present invention provides for a hydraulic coupling device (HCD) that consists essentially of a female component [28] and a male component machined in the form of a counter-sunk screw [29], wherein the said components form an integral part of the pressure transducer [30] as well as the end-cap [18] of the transducer-cum-electronics compartment [13] of the pressure housing [12]. These components, together with the viscous oil deposited within the space provided between the front-end of the pressure transducer [30] and the said counter-sunk screw [29], and the narrow gap between the threads of the said male and the female components provides the requisite path for transmission of seawater pressure to the pressure-port of the transducer, thereby hydraulically connecting the pressure transducer to the surrounding saline water medium. The HCD provided in the system of the present invention allows for easy replacement of oil by merely unscrewing its male component from its slot, pouring oil into the pressure port, and then screwing it back again, thereby preventing trapping of air bubbles or other hollow closed spaces within the oil reservoir. A hollow cylindrical shaped transducer-retainer [31] screwed on the inner face of an axial recess on the seal plate [18] serves the purpose of providing mechanical stability to the pressure transducer [30]. Another hollow cylinder [32] screwed on the outer face of a step on the seal plate [18] serves as a means for mounting two clamps [33] which serve as another means for mounting the printed circuit board (pcb)[34], with the use of four similar screws [35]. A cylindrical-shaped hollow space carved out from a metal bolt [36], rendered waterproof with the use of an O-ring [37], serves as a means for locating a temperature sensor [38] for measurement of water temperature. A battery-pack [39] serves as a means for supplying electric power to the circuits and sensors, and a computer-interfacing means [40] for initialization and data offloading.

Figure 3:
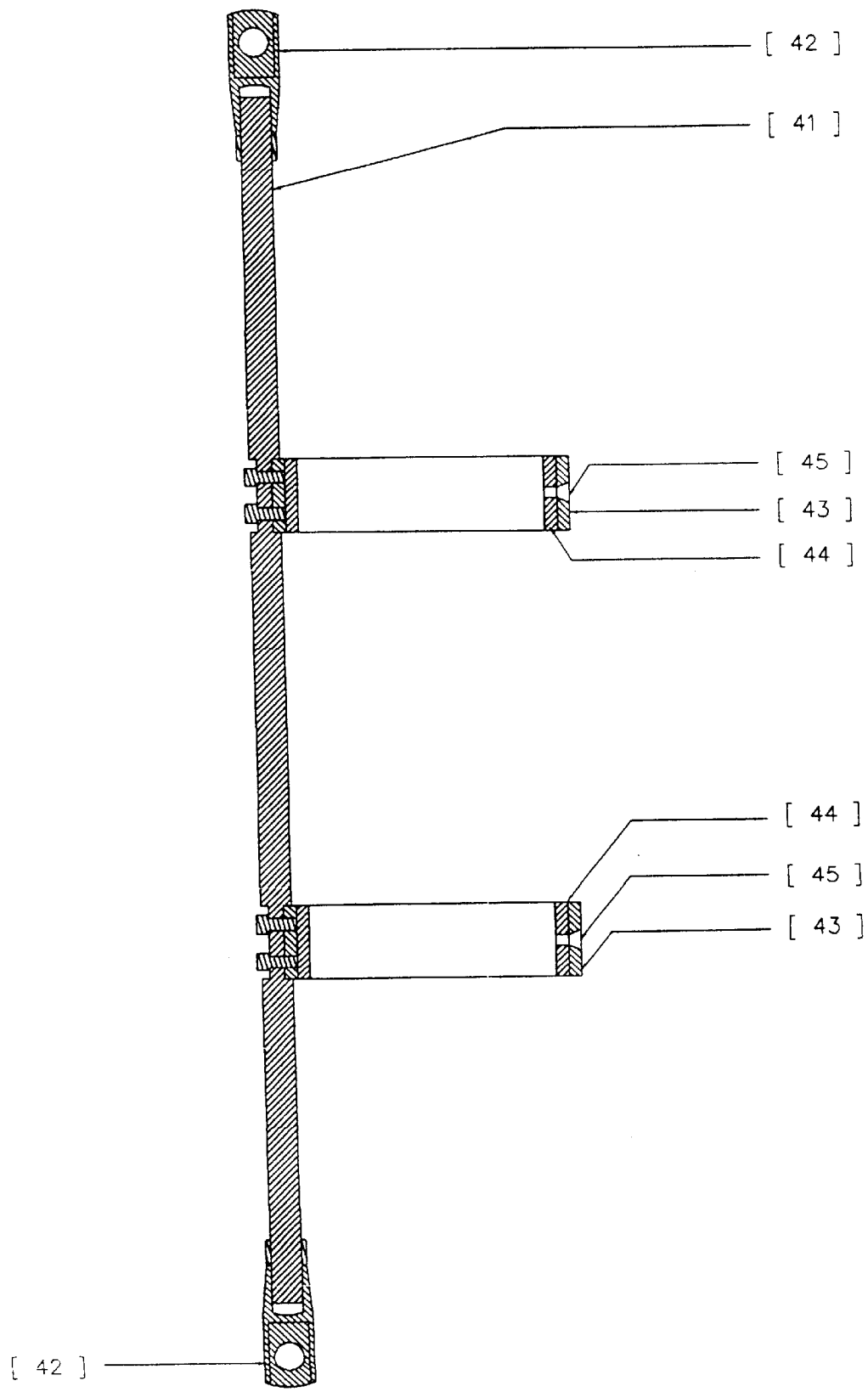
FIG. 3 represents the cross-sectional view of a mounting device used in the novel pressure housing for in water pressure based systems of the present invention.

FIG. 3 is a cross-sectional view of a mounting device [41], provided with two eye-nuts [42] and two collars [43] and two cushioning non-metallic collars [44] which can be sandwiched between the pressure housing [12] and collar [43] and joined together with the use of a few similar screws [45]. This device serves as an easy means for mounting the pressure housing [12] to a suitable device deployed in the sea.

Figure 4:
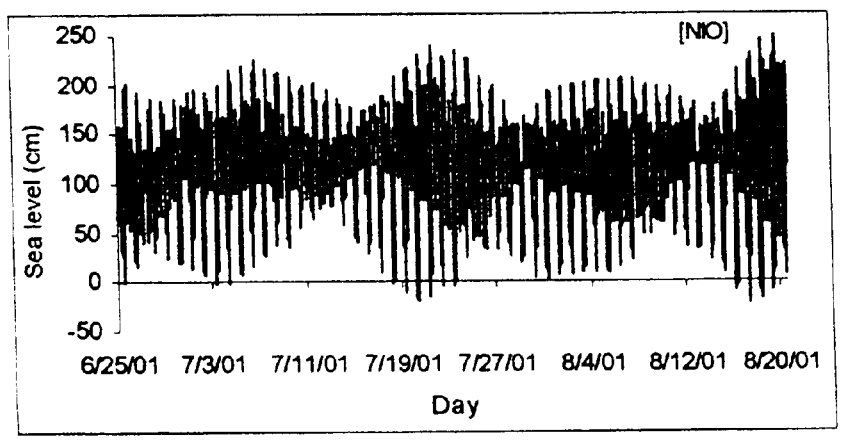
FIG. 4 shows the time-series sea level records measured by the pressure transducer-cum-electronic incorporated in the pressure housing of the present invention.

FIG. 4 shows the time-series sea level records measured by the pressure transducer-cum-electronics incorporated in the pressure housing of the present invention.

Figure 5:
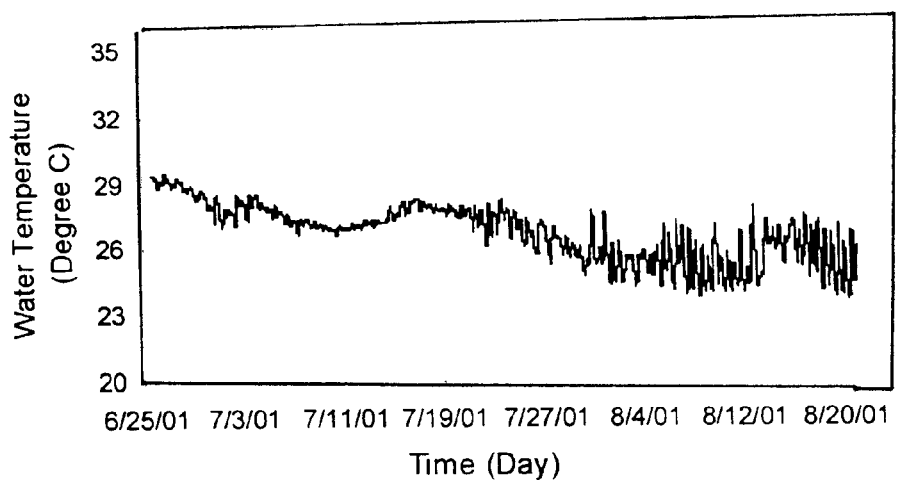
FIG. 5 shows the time-series water temperature records measured by the temperature transducer-cum electronics incorporated in the pressure housing of the present invention.

FIG. 5 shows the time-series water temperature records measured by the temperature transducer-cum-electronics incorporated in the pressure housing of the present invention.

Figure 6:
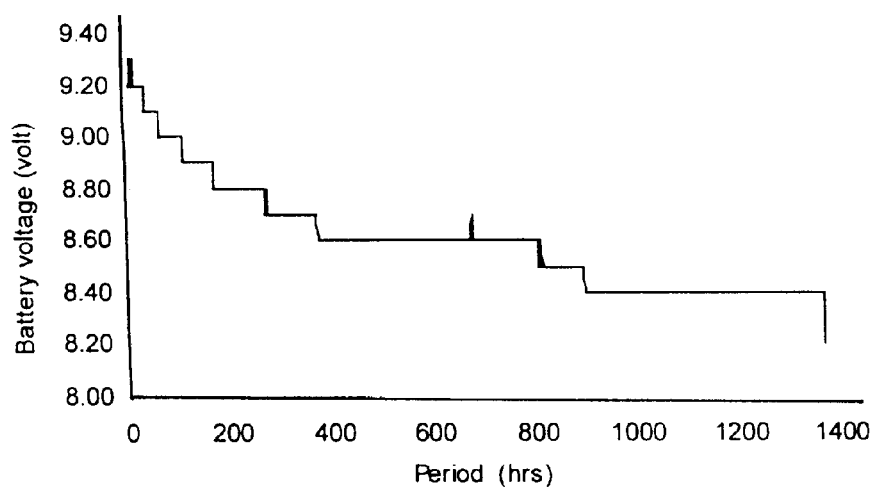
FIG. 6 shows the time-series battery voltage records logged by the data logger incorporated in the pressure housing of the present invention.

FIG. 6 shows the time-series battery voltage records logged by the data logger incorporated in the pressure housing of the present invention.

The present invention provides a novel pressure housing for in-water pressure based systems comprising a cylindrical housing [12] with two compartments [13] and [14]. The two compartments are separated by a circular disc [15] formed separating the two compartments from each other. One of the said compartments [13] is dedicated to mount the transducers and the electronics and the other compartment [14] is dedicated to locate the battery pack and the electric connector that would interface to a computer or any other device that enables initialization of the electronics and data offload, an electrical connector [16] that is provided with an O-ring [17] and axially located at the center of the circular disc [15] serving the purpose of electrically connecting the two compartments [13] and [14], a seal plate [18] provided with a pair of lateral O-rings [19] and [20] enabling weatherproofing of the transducers-cum-electronics compartment [13], a retainer ring [24] for locking the seal plate [18] in its designated position, another seal plate [21] provided with a pair of lateral O-rings [22] and [23] enabling waterproofing of the battery pack-cum-connector compartment [14], a retainer ring [25] for positioning the seal plate [21] in its designated location, and a lock ring [26] for locking the retainer ring [25], thereby providing an elegant locking device without the use of screws, bolts, nuts, or clamps, a hydraulic coupling device that consists essentially of a female component [28] and a male component machined in the form of a counter-sunk screw [29], wherein the said components forming an integral part of the pressure transducer [30] as well as the end-cap [18] of the transducer-cum-electronics compartment [13] of the pressure housing [12], the said two components, together with the viscous oil deposited within the space provided between the front-end of the pressure transducer and the said counter-sunk screw, and the narrow gap between the threads of the said male and the female components of the hydraulic coupling device for providing the requisite path for transmission of seawater pressure to the pressure-port of the transducer, thereby hydraulically connecting the pressure transducer to the surrounding saline water medium, a hollow cylindrical shaped transducer-retainer [31] screwed on the inner face of an axial recess on the seal plate [18] for providing mechanical stability to the pressure transducer [30], another hollow cylinder [32] screwed on the outer face of a step on the seal plate [18] for mounting two clamps [33] which serve as means for mounting the printed circuit board (pcb)[34], with the use of four similar screws [35], a hollow space carved out from a metal bolt [36], rendered waterproof with the use of an O-ring [37] for locating a temperature sensor [38] for measurement of water temperature, a battery pack [39] for supplying electric power to the circuits and sensors, and a computer-interfacing means [40] for initialization and data offloading.

The pressure housing is provided with a separate transducers-cum-electronics compartment, thereby improving the lives of the transducers and the electronics components by maintaining a humidity-free and clean environment around them by avoiding the entry of contaminating agents such as humidity, dust, or any suspended particles in the air during occasional data offloading, initialization of the instrument, or battery replacement performed in field stations. The pressure housing is provided with a separate battery pack-cum-connector compartment thereby allowing occasional data offloading, initialization of the instrument, or battery replacement in field stations without contaminating the clean environment surrounding the transducers and the electronics that form the essential part of the measuring instrument located within the pressure housing.

The two separate compartments of the pressure housing are carved out from a single solid material for providing sturdiness and elegance. The body of the pressure housing, its seal plates, an locking rings are all fabricated from non-metallic materials to prevent chemically induced corrosion during prolonged submergence in seawater or polluted water bodies. The technique of using retainer ring [25] for positioning the seal plate [21] in its designated location, and a lock ring [26] for locking the pressure housing avoids the use of conventionally used protruding bolts, nuts, or clamps.

The hydraulic coupling device is provided with a female and a male component, both selected from copper or copper alloy thereby inhibiting bio-fouling in the vicinity of the pressure inlet. The hydraulic coupling device is provided with a flat termination that remains at the center of and flush with the flat seal plate of the pressure housing, thereby abating dynamically induced pressure-measurement inaccuracies arising from the influence of flows, waves, or a combination of flows and waves.

The technique of the hydraulic coupling device allows for easy replacement of oil by merely unscrewing its male component from its slot, pouring oil into the pressure port, and then screwing it back again, thereby preventing trapping of air bubbles or other hollow closed spaces within the oil reservoir. The simpler design of the hydraulic coupling device allows for a much easier and more economically feasible construction that heretofore been unknown, simultaneously providing all the essential requirements expected of such a device.

The pressure housing is provided with a stainless steel mounting device having two cylindrical collars, thereby providing an easy means for mounting it to a suitable device during its deployment in the seawater. The said cylindrical collars of the mounting device are provided with two cushioning non-metallic collars that are sandwiched between the metallic collars and the curved surface of the two groves carved on the surface of the non-metallic pressure housing, thereby preventing possible biting action on the pressure housing by the metallic collars.

The self-adhesive transparent polyester thin film stickers are used to protect the smooth surface areas of the non-metallic pressure housing against marine growth and the metallic mounting device against pitting action, thereby enhancing the health of the pressure housing and the mounting device and enabling their trouble-free cleansing after retrieval from the seawater after prolong submergence.

The device of the present invention has been implemented to record time-series of sea level and water temperature data (together with time-series of the recorder's battery voltage) from Zuari estuary, Goa over a period of three months. It was observed that the device of the present invention worked efficiently and without any problems. The performance of the hydraulic coupling device was found to be excellent in terms of visual indicators such as holding the viscous oil, and inhibiting marine growth. The self-adhesive transparent polyester thin film stickers that have been stuck over a portion of the device, for validation purposes, preserved its elegance by drastically reducing the attachment of mollusk relative to the areas unprotected by the sticker. Further, cleaning the areas protected by the self-adhesive transparent polyester thin film stickers was exceedingly simpler relative to cleansing the unprotected areas.

The main advantages of the present invention are:
1. It improves the life of the transducers and the electronics of an underwater system by maintaining a humidity-free and clean environment around them by avoiding the entry of humidity, dust, or any suspended particles in the air during occasional data offloading and battery replacement in a humid and dust-laden field-station.
2. It allows trouble-free closing and opening of the pressure housing by the use of a novel arrangement, thereby avoiding the use of conventionally employed cumbersome protruding and corrosion-prone locking devices such as screws, bolts, or clamps.
3. It permits reliable transmission of water pressure to the pressure port of the transducer, simultaneously minimizing the errors arising from dynamic pressure effects, preventing its chemical corrosion from saline water, and arresting bio-fouling in the vicinity of the pressure inlet with the use of a compact, non-corrosive, bio-fouling-resistant hydraulic coupling device.
4. It provides elegance, lightness, and non-corrosiveness to the in-water pressure based system for use in a marine environment.
5. It provides means to prevent pitting action, thereby enhancing the health of the pressure housing and the mounting device and enabling their trouble-free cleansing after retrieval from the seawater after prolong submergence.
6. It provides for a simpler design of the hydraulic coupling device, thereby permitting a much easier and more economically feasible construction, simultaneously providing all the essential requirements expected of such a device.
7. The time-constant of the spiral-shaped oil path incorporated on the hydraulic coupling device provides a certain level of mechanical filtering of the high-frequency oscillations present in pressure measurements, caused primarily by wind-induced gravity waves and secondly by the movements of ships and boats.

We claim:

1. A pressure housing for in-water pressure based systems, comprising a housing having a first compartment and a second compartment. The compartments being separated from each other by a circular disc, the first compartment dedicated to mount at least one transducer and at least one electronic component and the second compartment dedicated to locate a battery pack and an electric connector that interface to an initialization device to enable initialization of the electronics and data offload, an electrical connector provided with an O-ring and axially located at the center of the circular disc to electrically connect the first compartment and second compartment and a first seal plate having a primary pair of lateral O-rings to weatherproof the first compartment, a first retainer ring for locking the first seal plate in its designated position, second seal plate provided with a secondary pair of lateral O-rings and to waterproof the second compartment, a second retainer ring for positioning the second seal plate in its designated location, and a lock ring for locking the second retainer ring, a hydraulic coupling device consisting essentially of a female component and a male component machined in the form of a counter-sunk screw, wherein the said female and male components form a part of a pressure transducer as well as the end-cap of the first compartment of the pressure housing, the female component and a male component, together with a viscous oil deposited within the space provided between a front-end of the pressure transducer and the counter-sunk screw, and a narrow gap between the threads of the male and female components of the hydraulic coupling device providing a path for transmission of seawater pressure to a pressure-port of the transducer, thereby hydraulically connecting the pressure transducer to a surrounding saline water medium, a first hollow cylindrical shaped transducer-retainer screwed on an inner face of an axial recess on the first seal plate for providing mechanical stability to the pressure transducer, a second hollow cylindrical shaped transducer retainer screwed on the outer face of a step on the second seal plate for mounting two clamps which serve as means for mounting a printed circuit board, with the use of four screws, a hollow space carved out from a metal bolt, rendered waterproof with the use of an O-ring for locating a temperature sensor for measurement of water temperature, a battery pack for supplying electric power, and a computer-interface for initialization and data offloading.

2. The pressure housing of claim 1 wherein the body of the pressure housing, the seal plates the locking ring, and the retaining rings comprise non-metallic materials to prevent chemically induced corrosion during prolonged submergence in seawater or polluted water bodies.

3. The pressure housing of claim 1 wherein the female component and male component are made of copper or copper alloy material capable of inhibiting bio-fouling in the vicinity of the pressure inlet.

4. The pressure housing of claim 1 wherein the hydraulic coupling device is provided with a flat termination that is located on a second seal plate of the pressure housing and flush with the pressure housing so as to abate dynamically induced pressure-measurement inaccuracies arising from the influence of flows, waves, or a combination of flows and waves.

5. The pressure housing of claim 1 wherein the cylindrical collars of the mounting device comprise two cushioning non-metallic collars sandwiched between the metallic collars and a cured surface of two grooves carved on a surface of the non-metallic pressure housing, thereby preventing possible biting action on the pressure housing by the metallic collars.

6. The pressure housing of claim 1 wherein a self-adhesive polyester thin film sticker is used protect the smooth surface areas of the non-metallic pressure housing against marine growth and on the metallic device against pitting action to protect the pressure housing and the mounting device from corrosion.

7. The pressure housing of claim 6 wherein a self-adhesive polyester transparent thin film sticker maintains color and texture of the pressure housing and a mounting device, and provides an additional means for preserving the text stamped on the pressure housing.

* * * * *